3,149,114
NEW DERIVATIVE OF TETRACYCLINE AND
PROCESS FOR THE PREPARATION THEREOF
Boris Gradnik, Andrea Pedrazzoli, and Gianmario Cipelletti, all of Milan, Italy, assignors to Societe d'Etudes de Recherches et d'Applications Scientifiques et Medicales, E.R.A.S.M.E., Paris, France, a French society
No Drawing. Filed Mar. 29, 1960, Ser. No. 18,247
Claims priority, application Great Britain Mar. 31, 1959
1 Claim. (Cl. 260—268)

The present invention relates to a new derivative of tetracycline and also to a special process which has been discovered for the preparation of this derivative.

It is known that organic derivatives comprising at least one active hydrogen atom are capable of undergoing an amino-methylation reaction by substitution of the active hydrogen atom; this reaction, which involves formaldehyde and a primary or secondary amine, was described in 1912 and is known by the general name of the "Mannich reaction."

It has recently been proposed to apply this type of reaction to a particular group of organic compounds, namely tetracyclines, their isomers and their anhydrous compounds.

The result of amino-methylation of compounds of this group is the production of soluble derivatives of tetracycline, which it has not been possible to obtain heretofore and which has made known tetracyclines unsuitable for use as antibiotics.

However, the particular derivative of tetracycline comprising N' - 4' - (beta - hydroxyethyl) - diethylenediaminomethyl-tetracycline has never been described previously, this derivative having the structural formula:

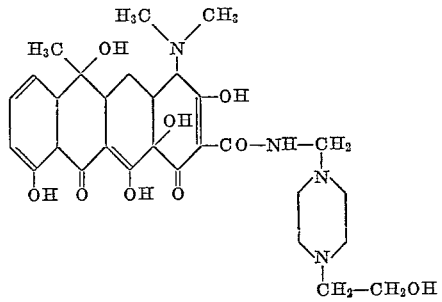

Consequently, the present invention contemplates, in a general manner, the process which comprises, in the Mannich reaction applied to tetracyclines, selecting as the amine N-(beta-hydroxyethyl)-diethylenediamine, with a view to obtaining the corresponding amino-methyl derivative of tetracycline indicated above, the derivative having by itself a whole series of particular properties which make it valuable, by comparison with amino-methyl derivatives of tetracycline which are already known.

It is extremely important to note that the novel process of the invention does not merely consist in the selection of the new reactant.

In fact, it has surprisingly been verified that the simple application of the known process, which has already been proposed in a general manner for the preparation of amino-methyl derivatives of tetracyclines and which consists in causing reaction of the reactants in solution in various solvents, although leading to the formation of the desired product, does not produce the high yields which would be expected.

Thus, various attempts to prepare the derivative of the invention by following the standard procedure have only given yields ranging from 80–60%.

On the other hand, the invention contemplates an improvement in the standard process which, with other conditions remaining the same, allows yields of 95 to 98% always to be obtained.

The improvement according to the invention, with the amine being selected as indicated above, consists in carrying out the reaction, not in solution, but in suspension in a suitable reaction medium.

More specifically, it has been ascertained that the high yields mentioned can be obtained with the particular amine selected if the reaction is carried out with the reactants in suspension in isopropanol.

This discovery is particularly surprising, since there is nothing to indicate that the state of the reactants when in suspension instead of solution, would favour the course of the reaction and, even more, since this discovery has only been found with the particular amine mentioned, whereas attempts to obtain the same improvement in carrying out the same process with other amines have instead caused considerable reduction in the yields of the reaction.

The invention consists principally in a process for the preparation of N'-4'-(beta-hydroxyethyl)-diethylenediaminomethyl-tetracycline, which comprises selecting, as the amino-methylation reactant in the Mannich reaction as applied to tetracyclines, N-beta-hydroxyethyldiethylenediamine and carrying out the reaction with the reactants in suspension in isopropanol.

The novel derivative of tetracycline obtained by carrying out this process is a stable derivative and has a high solubility in water, even at a pH around neutrality; it is particularly characterised by a toxicity and by local irritant effects which are reduced to remarkably low levels as compared with other, known amino-methyl derivatives of tetracycline.

Consequently, the novel compound is remarkably well tolerated in the human system, particularly by intramuscular injection of its aqueous solutions.

This invention is described below with reference to an example of the above process and by indicating in more detail the various physical and biological properties of the novel compound of the invention.

EXAMPLE 1.55 g. paraformaldehyde were added to a solution of 7 g. N-(beta-hydroxyethyl)-diethylenediamine in 150 cc. isopropanol and the whole was heated to 60° C. for 30 minutes, to obtain complete dissolution; after cooling the solution to 40° C., 22.2 g. of anhydrous tetracycline base were added as a fine powder and the reaction was allowed to proceed for 3 hrs. with agitation and while passing through a current of dry nitrogen; the solution was then filtered on a Büchner funnel and the filter cake was washed twice with 20 cc. isopropanol; the crystalline cake was resuspended in 100 cc. anhydrous ether, again filtered and washed three times with 50 cc. anhydrous ether; finally, it was dried in vacuo and 28.6 g. of product were obtained, namely a yield of 98%.

The characteristics of this product are as follows:

It is a pale yellow, non-odourous, slightly bitter, crystalline powder, very soluble in water ($>1.5$ g./cc.), soluble in methanol and formamide, slightly soluble in ethanol and isopropanol, insoluble in ether, benzene and chloroform;

The pH of a 2% aqueous solution is 7.4–7.6;

Melting point=162°–163° C. with recomposition (uncorrected);

$(\alpha)_D^{20} = -175 \pm 3$ (in 0.5% solution in methanol);
$(\alpha)_D^{20} = -195 \pm 3$ (in 0.5% solution in water);

UV absorption: a 10γ/cc. solution in N/10 HCl has at 35 mμ an absorption maximum E=0.244.

Analysis.—Calculated for $C_{29}H_{38}O_9N_4$: C=59.37, H=6.53, N=9.55. Found: C=58.93, H=6.72, N=9.42.

*Activity and toxicity.*—Microbiological tests have shown that the introduction of the new side-chain into tetracycline base does not modify the antibiotic activity thereof; in the same doses, calculated as tetracycline base, the derivative of the invention has the same activity and the same antibacterial spectrum as tetracycline base. In other words, 1 g. of N'-4'-(beta-hydroxyethyl)-diethylene-diaminomethyl-tetracycline corresponds to 756 mg. of tetracycline base. DL 50: the same as that of tetracycline hydrochloride, namely of the order of 145 mg./kg., calculated as tetracycline base (in mice).

*Solubility.*—The solubility in water of the product of the present invention (notably higher than 1.55 g./cc.) is much higher than that of tetracycline hydrochloride (0.1 g./cc.), reported in U.S. Pharm. (XV ed., p. 727) and higher than that of pyrrolidyl-methyl-tetracycline (1.25 g./cc.), reported by W. Siedel et al., in Munch. med. Wochschr. (100, 1958, p. 661).

This new derivative, due to its high solubility, also permits hematic levels to be obtained by intramuscular administration which are considerably higher than those obtained with known derivatives of tetracycline.

What we claim is:

A compound of the formula:

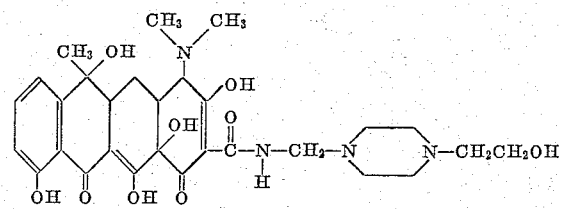

References Cited in the file of this patent

FOREIGN PATENTS

3169/57  Republic of South Africa __ Sept. 26, 1957